United States Patent

Marshall

[15] 3,702,567

[45] Nov. 14, 1972

[54] WHEEL COVER BALANCING APPARATUS AND METHOD

[72] Inventor: Claude J. Marshall, Ann Arbor, Mich.

[73] Assignee: North American Rockwell Corporation, Pittsburgh, Pa.

[22] Filed: Feb. 25, 1971

[21] Appl. No.: 118,601

[52] U.S. Cl. .................................................. 73/487
[51] Int. Cl. ............................................. G01m 1/04
[58] Field of Search ........ 73/482, 483, 484, 485, 486, 73/487; 29/159 A; 301/5 B, 37 R

[56] References Cited

UNITED STATES PATENTS

| | | | |
|---|---|---|---|
| 3,036,468 | 5/1962 | Anderson | 73/482 X |
| 3,057,664 | 10/1962 | Lyon | 301/37 B |
| 3,415,575 | 12/1968 | Spisak | 301/5 B |
| 3,181,371 | 5/1965 | Lannen | 73/483 |

Primary Examiner—James J. Gill
Attorney—John R. Brouaugh, Floyd S. Levison, E. Dennis O'Connor and Richard S. Speer

[57] ABSTRACT

Apparatus for use with a static balancing machine for determining the static balance condition of an automotive wheel cover having spring fingers radially spaced about the rim of the wheel cover. The apparatus comprises a fixture having a recess adapted to receive the wheel cover, a lead-in chamfer configuration adjacent the recess and serving to align the wheel cover with the recess and a power ram registering with the fixture for forcing the spring fingers of a wheel cover placed on the chamfer into a pressure engaging state with the recess wall.

Use of the apparatus described above mounted to the spindle of a static balancing machine allows an improved method of balancing the wheel cover. This method includes aligning the wheel cover axis with respect to the vertical axis of the spindle so that the axes coincide by forcing the spring fingers simultaneously and uniformly into a pressure engaging state within a recess of said fixture. Any out of balance condition indicated by the balancing machine then may be corrected and the wheel cover placed in a balanced state.

16 Claims, 5 Drawing Figures

INVENTOR
Claude J. Marshall

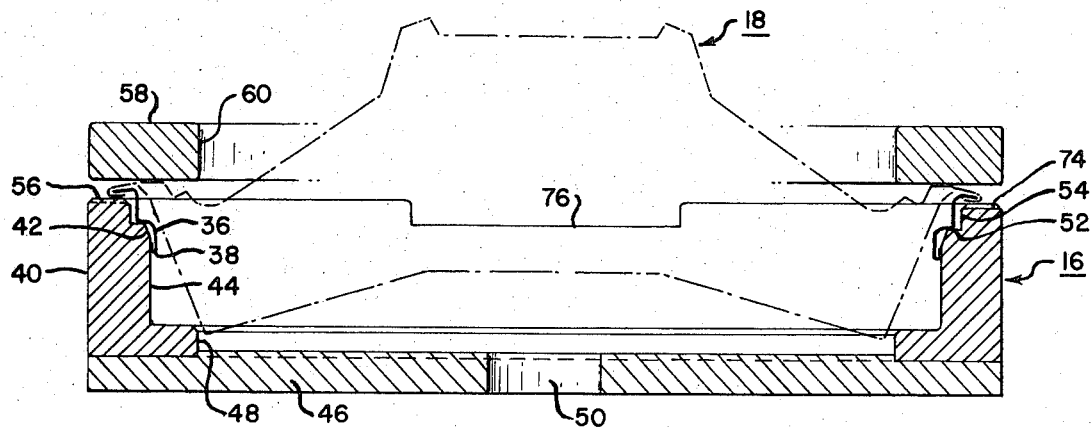
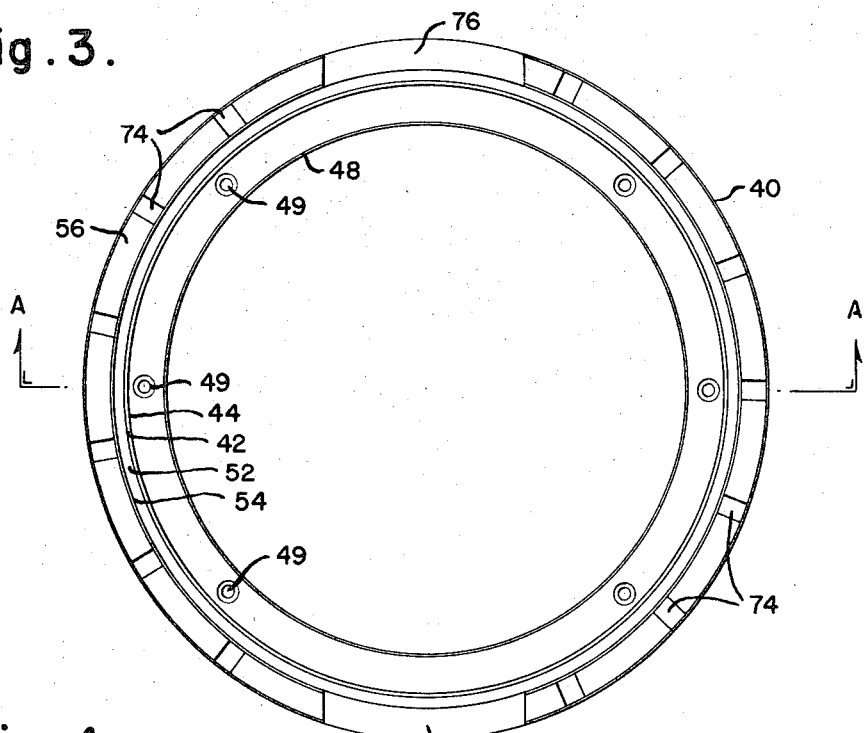
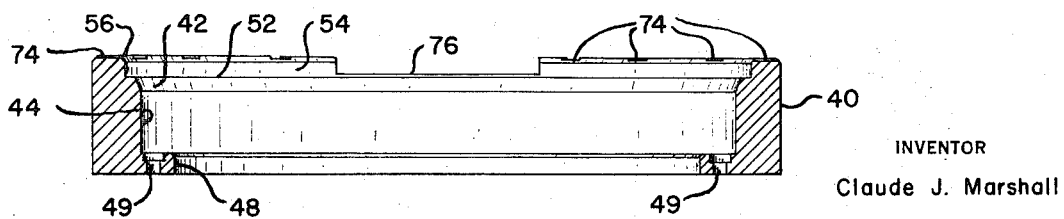
INVENTOR
Claude J. Marshall

WHEEL COVER BALANCING APPARATUS AND METHOD

BACKGROUND OF THE INVENTION

A common design and production requirement for automotive wheel covers is that the wheel covers be statically balanced to within certain tolerances, such as 0.5 oz. in.

In the past, such balancing has been accomplished by clamping a wheel cover within a fixture secured to the spindle of a balancing machine. Such fixtures generally have been circular to receive a wheel cover and have comprised plural segments with at least one of the segments being stationary and the other segments being pivotally movable with respect to the stationary segment. This arrangement allowed the movable segments to be swung radially outwardly from the center of the fixture to open the fixture and allow a wheel cover to be placed such that the wheel cover spring finger gripping portions located radially about the wheel cover were surrounded by the segments. The movable segments then were cammed back into their original position wherein they bore against the spring fingers thereby to hold the wheel cover between the movable segments and the stationary segment. Small weights were then added where needed to balance the wheel cover.

It was found that clamping the wheel cover asymmetrically by means of the movable fixture segments had the disadvantage of promoting unequal flexing of the spring fingers. After balancing a wheel cover using the multiple segment fixture, if the wheel cover was to be partially rotated and again placed in the fixture, an unbalanced condition often was found. This occurred because sideways clamping of the spring fingers caused inherent off-center positioning of the wheel cover axis with respect to the balancing fixture axis.

An object of this invention is to provide a simplified balancing fixture for wheel covers. Such a simplified balancing fixture has the advantage of being less expensive to manufacture. More importantly, such a simplified balancing fixture enables faster and more accurate wheel cover balancing than did previous fixtures.

Another object of this invention is to provide an improved static wheel balancing method which is faster and more accurate than previously known methods.

SUMMARY OF INVENTION

The invention includes apparatus useful with a static balancing machine for determining the static balance of a wheel cover having spring fingers radially spaced about a peripheral rim thereof. This apparatus comprises a wheel cover fixture attached to a spindle of said machine and a power ram for registering with the fixture. The fixture has a recess formed therein comprising an initial funnel portion defined by a lead-in chamfer adapted to receive wheel cover spring fingers and having an inner edge abutting a walled fixture portion defining the inner extent of the recess. The walled portion circumscribes a diameter less than the diameter circumscribed by the radially spaced spring fingers in an unflexed state.

The method of utilizing the above apparatus includes balancing a wheel cover. Such a wheel cover, after being placed on the fixture, is contacted by the power ram and forced down into the recess. The spring fingers are cammed down the funnel portion and are simultaneously placed in a pressure engaging state with the walled portion thereby aligning the wheel cover axis and vertical spindle axis in coincidence. The ram is then retracted and a static balance reading is taken. Small weights are then added as needed to correct any out of balance condition detected.

DESCRIPTION OF THE DRAWINGS

Other features of the invention will become apparent from the following detailed description and from the accompanying drawings in which:

FIG. 2 is a side section view of a portion of the apparatus of FIG. 1 showing an automotive wheel cover with resilient spring fingers in phantom in pressure engagement with a recess wall of the wheel cover balancing fixture;

FIG. 3 is a plan view of the balancing fixture;

FIG. 4 is a sectional view of a component of the fixture taken along the line A—A of FIG. 3.

DETAILED DESCRIPTION OF THE INVENTION

Figure 1:
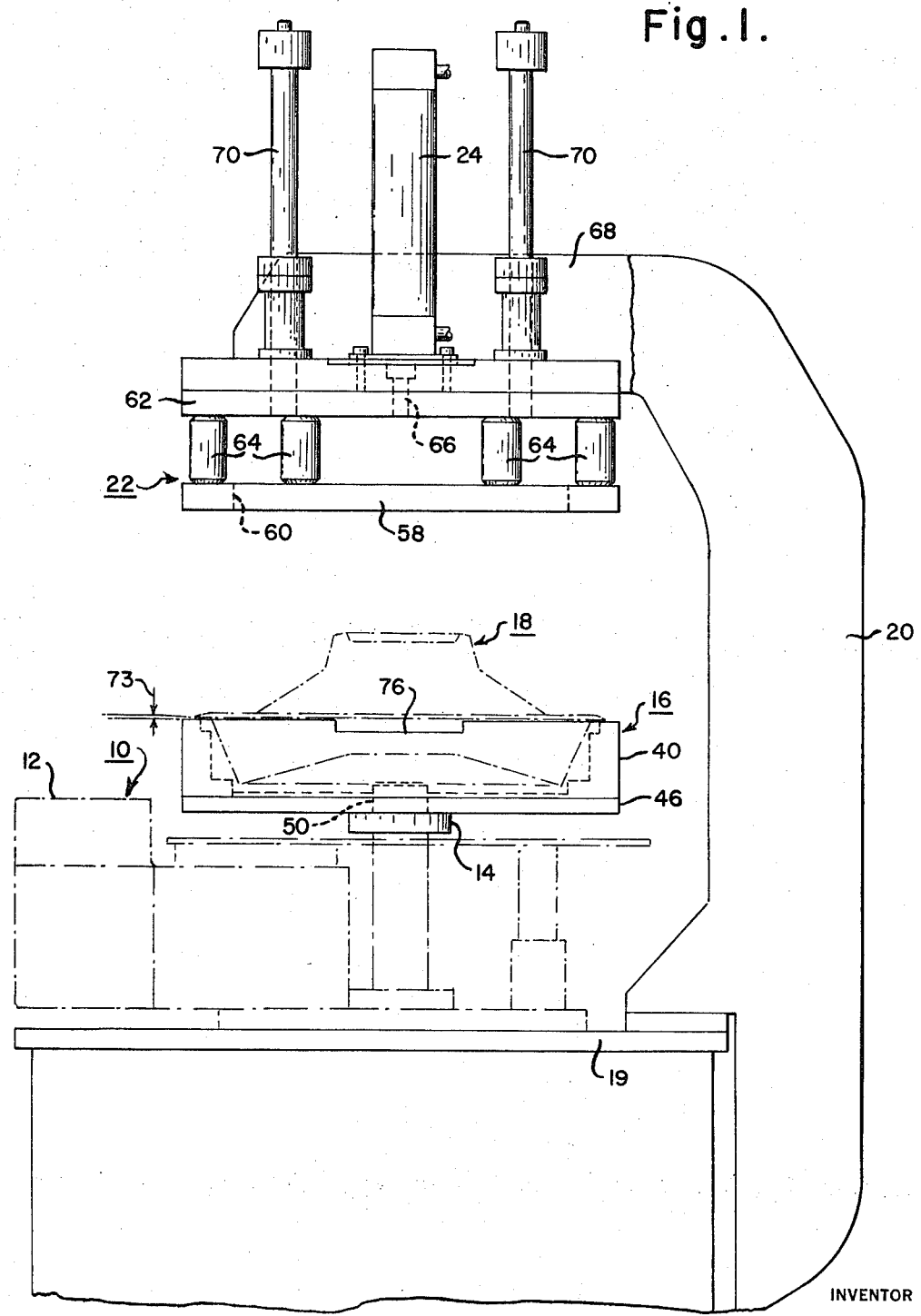
FIG. 1 is a side elevational view with parts broken away of an improved cover wheel balancing apparatus and showing a wheel cover in phantom roughly aligned on a balancing fixture.

Referring now to the apparatus shown in FIG. 1, a conventional static balancing machine 10, such as that disclosed in U.S. Pat. No. 3,181,371 entitled "Universal Balance Testing Machine," patented by Joseph P. Lamen on May 4, 1965, is shown having a graduated bubble dial 12 and a spindle 14. A balancing fixture 16 is attached to the spindle 14 and serves to mount a conventional automotive wheel cover 18 shown in phantom. A support arm 20 extending from balancing machine base 19 mounts an overhead ram 22 powered by an air cylinder 24. Ram 22 is used to force the wheel cover into a recess of the balancing fixture.

Figure 5:
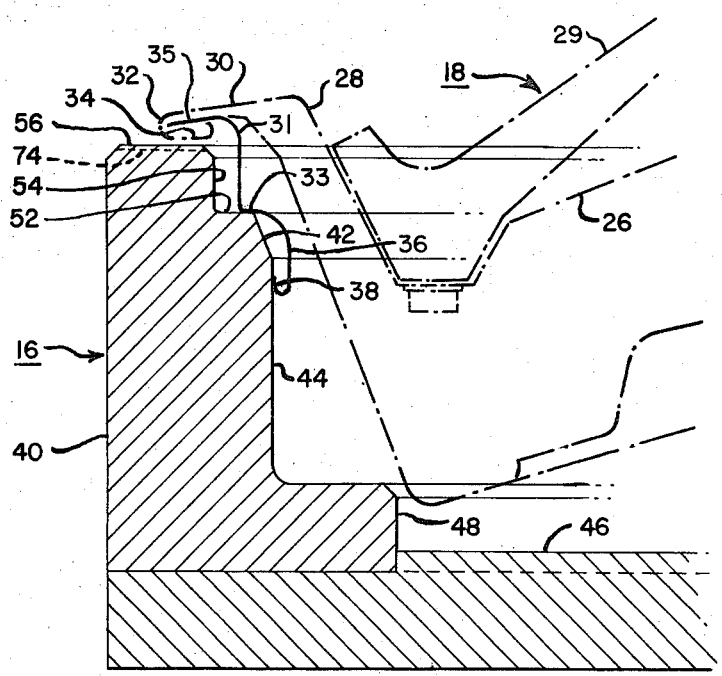
FIG. 5 is an enlarged fragmentary cross-sectional view of a portion of the structure of FIG. 2 and showing additional details of the wheel cover illustrated in phantom.

As best viewed in FIGS. 2 and 5, wheel cover 18 is a conventional circular wheel cover used to engage an automotive wheel rim. Such a wheel cover is disclosed in U.S. Pat. No. 3,057,664 entitled "Wheel Cover," patented by G. A. Lyon on Oct. 9, 1962. The wheel cover is of a dished type and includes a central crown 26, a dished cover portion 28, an outer cover margin 30 and a central ornament 29 (FIG. 5) secured to crown 26. The outer cover margin 30 is an annular generally radially outwardly and axially sloping margin provided with an underturned extremity 32 that includes the outer edge of the wheel cover.

The cover has separately formed and attached retaining structure in the form of a continuous circular retaining flange 31 having a marginal portion 35 crimped retainingly in place behind the outer cover margin 30 by an underturned reinforcing and finishing bead flange 34 that is integral with extremity 32. An intermediate annular stepped shoulder 33 in the retaining flange 31 is provided which is designed to engage against an automobile wheel flange for determining the axially inward disposition of the cover on the wheel. At its axially inner margin the retaining flange 31 has a series of generally axially inwardly extending resilient spring fingers 36 which are radially flexible. Short and stiff generally radially and axially outwardly oblique turned retaining terminals 38 on the fingers 36 are designed to engage in retaining gripping relation against an inner face of an automobile wheel rim for retaining the cover on the wheel. The spring fingers 36 are separated by cut out areas (not shown) cut from the retaining flange 31. In addition to retaining flange structure as described above, it is also conventional to make the retaining fingers integral with the wheel cover.

The static balancing fixture 16 is shown in FIG. 2 to be made of two parts which define a recess adapted to receive a wheel cover. The first part of annular retaining member 40 having a central aperture therein. This central aperture consists of two portions--an initial funnel-shaped portion defined by a contoured lead-in chamfer 42 which abuts and circumscribes a second portion defined by inner wall 44. Inner wall 44 circumscribes a diameter smaller than the diameter circumscribed by the radially spaced spring fingers 36 in their unflexed state.

A second part of the balancing fixture is an adapter plate 46 which closes the aperture of retaining member 40, thereby acting as a recess base for balancing fixture 16. Retaining member 40 and adapter plate 46 are illustrated as secured by means of fasteners 49 passing through a right angle flange 48 extending from member 40. It also is possible to make the retaining member 40 and adapter plate 46 as an integral piece. Adapter plate 46 has a central aperture 50 as best viewed in FIGS. 1 and 2 which serves to allow mounting of the fixture 16 to the static balancing machine spindle 14.

It is preferred that chamfer 42 be formed of a wear-resistant material, such as carbon steel having a Rockwell C hardness of 65. Chamfer 42 merges at its outer edge with an annular horizontal plane portion 52 of retaining member 40. Plane portion 52 is bounded by a generally axially extending and radially inwardly facing annular flange 54. An annular marginal horizontal plane portion 56 of the fixture 16 meets annular flange 54 and partially underlies rim edge 32 of the wheel cover when the wheel cover is mounted in the fixture. Equally spaced depressions 74 (see FIGS. 3 and 4) are provided in the plane portion 56 of the fixture. The location of these depressions are made to correspond to the locations on the retaining flange 31 of the cut out areas between spring fingers 36 for an aligning purpose to be later explained.

As shown in FIG. 1, a power ram 22 is mounted overhead of the balancing fixture 16. This power ram consists of a flat plate 58 having a central aperture 60 extending therethrough for the clearance of the central portion of wheel cover 18. Flat plate 58 moves in unison with but is spaced from an upper plate 62 by spacers 64. Air cylinder 24 has a piston rod 66 extending therefrom which is connected to upper plate 62. Stationary guide channels mounted on arbor arms 68 (only one of which is shown) allow guide rods 70, which are attached to plate 62, to guide the movement of the ram. An operator actuated valve (not shown) controls operation of air cylinder 24.

To check the static balance of a wheel cover of the type described above the following sequence of operations is followed. As shown in FIG. 1, a wheel cover is placed by an operator on the balancing fixture with the spring finger tips 38 resting on the upper portion of chamfer 42. In this position, the wheel cover is not fully received in the recess of fixture 16 as can be seen from the spacing 73 between the wheel cover and the fixture. Thus, the spring fingers are the only portion of the wheel cover touching the balancing fixture. The operator then rotates the wheel cover to align one of the spaced depressions 74 opposite one of the previously described cut out areas of retaining flange 31 which separates adjacent spring fingers 36. Alignment of one depression 74 and one cut out area causes alignment of all the depressions 74 with the corresponding cut out areas of the retaining flange 31. Having thus initially roughly aligned the wheel cover, the operator then actuates air cylinder 24 to cause the flat plate 58 to act as a pressure ram and move towards the balancing fixture with which it registers. Flat plate 58 contacts outer cover margin 30 of the wheel cover with uniform force at multiple areas and causes spring finger tips 38 to be cammed down chamfer 42 and to engage simultaneously inner recess wall 44 as shown in FIGS. 2 and 5. It will be recalled that the diameter circumscribed by inner recess wall 44 is slightly less than the diameter circumscribed by the spring fingers in their unflexed state.

Thus, it is apparent that chamfer 42 acts as an aligning means circumscribing inner wall 44 which cooperates with the spring fingers to align the wheel cover relative to the balancing fixture recess upon the wheel cover being forced into the recess. The effect of simultaneously placing the spring fingers in uniform pressure engagement with inner recess wall 44 is to align the vertical axis of wheel cover 18 and the vertical axis of static balancing machine spindle 14 in coincidence with each other.

The operator causes the power ram to return to its upper position and then unlocks the balancing machine spindle (which has been locked until now by conventional means not shown to prevent damage by the power ram) and reads the out of balance condition, if any, on graduated bubble dial 12.

If an out of balance condition is indicated, a conventional weight and clip assembly or a combination of such assemblies is positioned around the circumference of cover margin 30 of the wheel cover to bring the balance bubble or the balance condition to as close to zero as possible. Since it is desired to fasten such an assembly to the retaining flange 31 in a cut out area between the spring fingers 36, the operator positions the assembly at the same peripheral location and at the same distance from the center of the wheel cover as it will have when attached to the wheel cover. Because the operator has previously aligned the cut out areas of retaining flange 31 with respect to the depressions 74, he now can place a weight assembly on surface 30 directly above such a cut out area by viewing the location of depressions 74. The operator marks the location of the weight assembly and then removes the wheel cover from the balancing fixture. Diametrically opposed depressions 76 are placed in the top surface 56 of the balancing fixture (see FIGS. 3 and 4) to enable the operator to grip the wheel cover with his hands or to use a prybar to pry the cover loose. The weight assembly or assemblies is then clipped on underneath the marking to retaining flange 31 in a cut out area. The spindle 14 is relocked and the operator is ready to balance the next wheel cover.

It may thus be seen that the use of the inexpensive and simplified balancing fixture described allows a rapid and repeatedly accurate static balancing of wheel covers.

It is further apparent that the method of coinciding the axis of the wheel cover with the axis of the balancing machine spindle by placing the wheel cover spring fingers in simultaneous pressure engagement with the balancing fixture allows a rapid and repeatedly accurate balancing of wheel covers.

Having thus described the invention in complete detail, it will be understood that these details need not be strictly adhered to and that various changes and modifications may be made, all falling within the scope of the invention as defined by the following claims.

What is claimed is:

1. Apparatus for determining the static balance of a wheel cover having spring fingers radially spaced about a peripheral rim thereof comprising:
   static balance detection means;
   fixture means attached to said static balance detection means;
   said fixture means having a central recess adapted to receive said wheel cover, said recess comprising an initial funnel portion adapted to receive said wheel cover spring fingers, said funnel portion having an inner edge abutting an inner walled portion of said fixture means, said walled portion circumscribing a diameter less than the diameter circumscribed by said radially spaced spring fingers in an unflexed state, whereby spring fingers cammed down said funnel portion are engaged by said walled portion.

2. The apparatus as defined in claim 1 further comprising power means registering with said fixture means for forcing said spring fingers of a wheel cover placed on said funnel portion into a pressure engaging state with said walled portion.

3. The apparatus as defined in claim 2 wherein said power means comprises a movable platen having a central aperture therethrough.

4. Apparatus for determining the static balance of a wheel cover having spring fingers radially spaced about a peripheral rim thereof, said apparatus comprising:
   a static balancing machine;
   fixture means mounted on said static balancing machine and having a recess adapted to receive said wheel cover;
   power means registering with said fixture for forcing a wheel cover into said recess; and
   aligning means circumscribing said recess and cooperating with the spring fingers of said wheel cover for aligning said wheel cover relative to said recess upon said wheel cover being forced into said recess.

5. The apparatus as defined in claim 4 wherein said aligning means is a chamfered surface.

6. The apparatus as defined in claim 4 wherein said power means further comprises a movable plate having a central aperture therethrough.

7. The method of statically balancing a wheel cover having spring fingers radially spaced about a peripheral rim thereof on a static balancing machine having a fixture with a recess adapted to receive said wheel cover comprising the steps of
   a. initially aligning said wheel cover on said fixture;
   b. forcing said spring fingers simultaneously into a pressure engaging state within said recess; and
   c. correcting any out of balance condition indicated by the said static balancing machine, thereby placing said wheel cover in a statically balanced state.

8. The method as defined in claim 7 further comprising uniformly flexing said spring fingers within said recess.

9. The method as defined in claim 7 wherein said forcing comprises applying a uniform force to multiple areas on said wheel cover.

10. The method as defined in claim 7 wherein said step of initially aligning is accomplished by placing said spring fingers on a chamfered surface circumscribing said recess.

11. The method as defined in claim 10 wherein said forcing further comprises camming said spring fingers along said chamfered surface into said recess.

12. The method of determining the static balance of a wheel cover having spring fingers radially spaced about a peripheral rim thereof on a fixture with a recess adapted to receive said wheel cover, which fixture is mounted on a spindle of a static balancing machine, the method comprising the steps of:
   a. initially aligning said wheel cover on said fixture;
   b. subsequently aligning the vertical axis of said wheel cover and the vertical axis of said spindle such that the axes coincide by forcing said spring fingers simultaneously into a pressure engaging state within said recess; and
   c. taking a static balance reading from said static balancing machine.

13. The method as defined in claim 12 further comprising uniformly flexing said spring fingers within said recess.

14. The method as defined in claim 12 wherein said forcing comprises applying a uniform force to multiple areas on said wheel cover.

15. The method as defined in claim 12 wherein said step of initially aligning is accomplished by placing said spring fingers on a chamfered surface circumscribing said recess.

16. The method as defined in claim 15 wherein said forcing further comprising camming said spring fingers along said chamfered surface into said recess.

* * * * *